(12) United States Patent
Haugseth et al.

(10) Patent No.: US 6,856,619 B1
(45) Date of Patent: Feb. 15, 2005

(54) COMPUTER NETWORK CONTROLLER

(75) Inventors: Paal Haugseth, Rasta (NO); Helge Simonsen, Olso (NO)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/520,065

(22) Filed: Mar. 7, 2000

(51) Int. Cl.[7] .......................... H04L 12/28; G06F 15/16
(52) U.S. Cl. ....................... 370/389; 370/235; 370/412; 370/395.4; 709/232; 709/236
(58) Field of Search ............................. 370/389, 395.4, 370/252, 229–236, 468, 411–417, 428–431; 709/213, 230–232, 236; 710/29

(56) References Cited

U.S. PATENT DOCUMENTS 4,410,889 A * 10/1983 Bryant et al. ................ 370/431
6,185,620 B1 * 2/2001 Weber .......................... 709/232
6,304,910 B1 * 10/2001 Roach .......................... 709/236

* cited by examiner

Primary Examiner—Steven Nguyen

(57) ABSTRACT

A computer network controller, preferably operative in a System Area Network (SAN), is described. In a SAN, such a network controller is implemented as a SAN Protocol Engine (SPE) for use in Host Channel Adapters (HCA) and Target Channel Adapters (TCA). The SPE is based on a programmable Multi-Context Micro Sequencer (MCMS) tightly coupled to a fully associative multi-context block (FACB), running dedicated instructions optimized for network protocols. Associated with the MCMS is a Data Buffer with a number of read and write ports. This enables the SPE to run different tasks in parallel. Attached to the MCMS is a link-dependent Packet Sender and Outbound Scheduler hereby called Network Protocol Engine (NPE). The SPE is capable of running multiple user-level RMDAs with implicit completion control.

18 Claims, 5 Drawing Sheets

San Protocol Engine

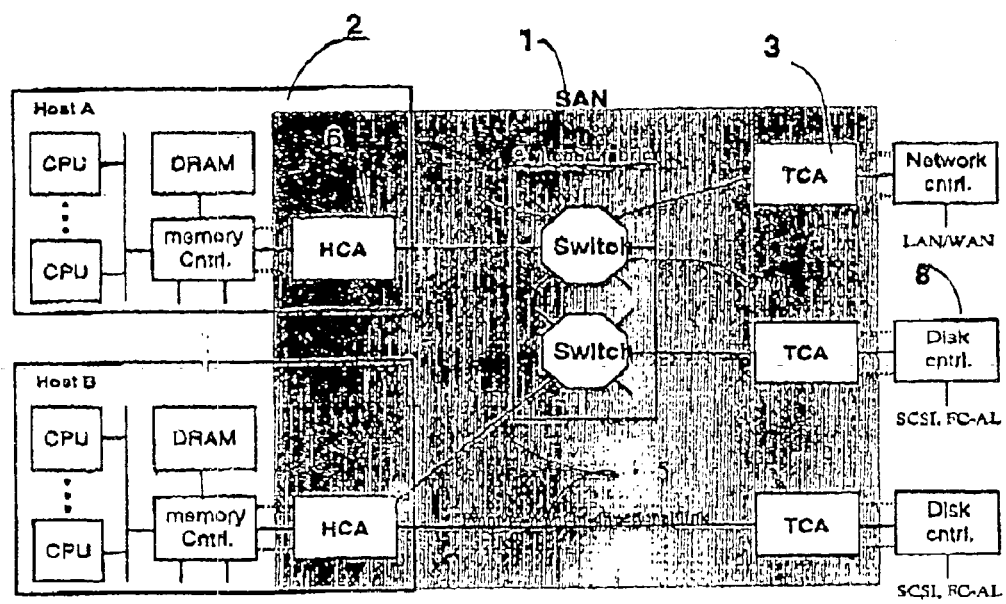
Figure 1. System Area Network

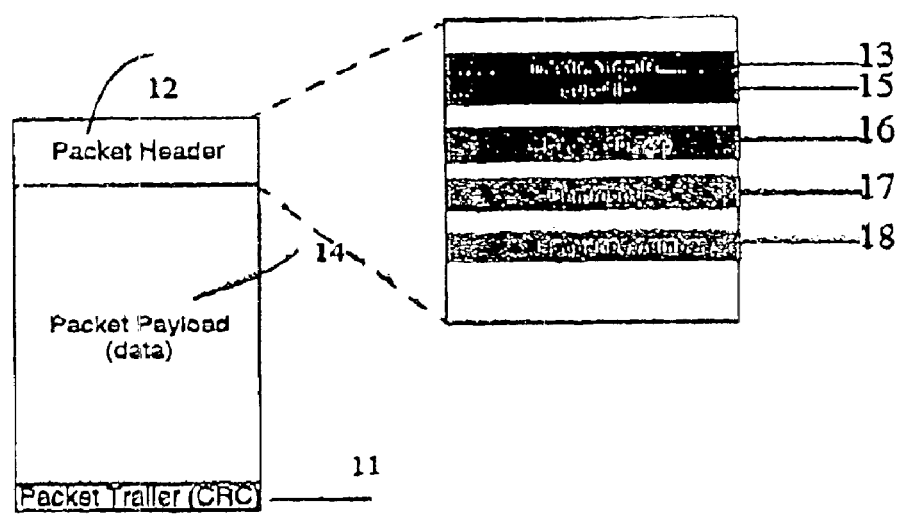
*Figure 2. Packet*

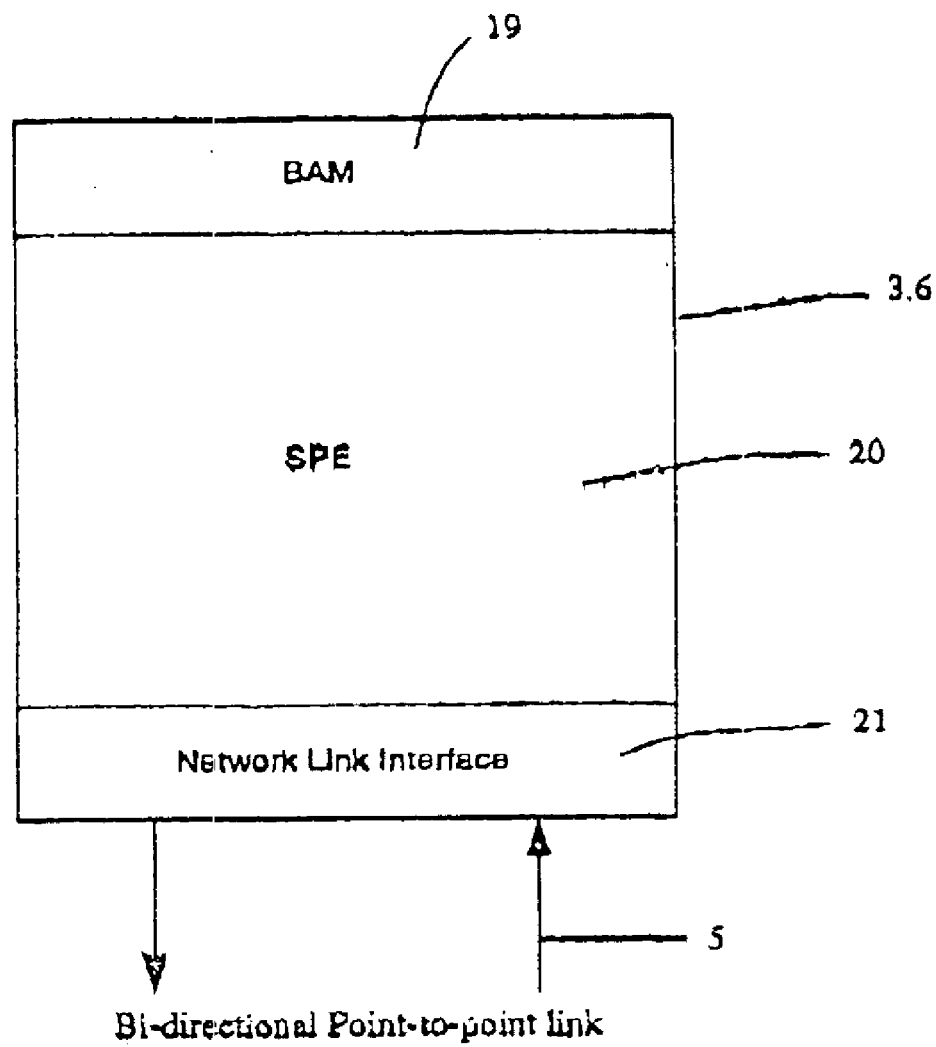
Figure 3. HCA/TCA

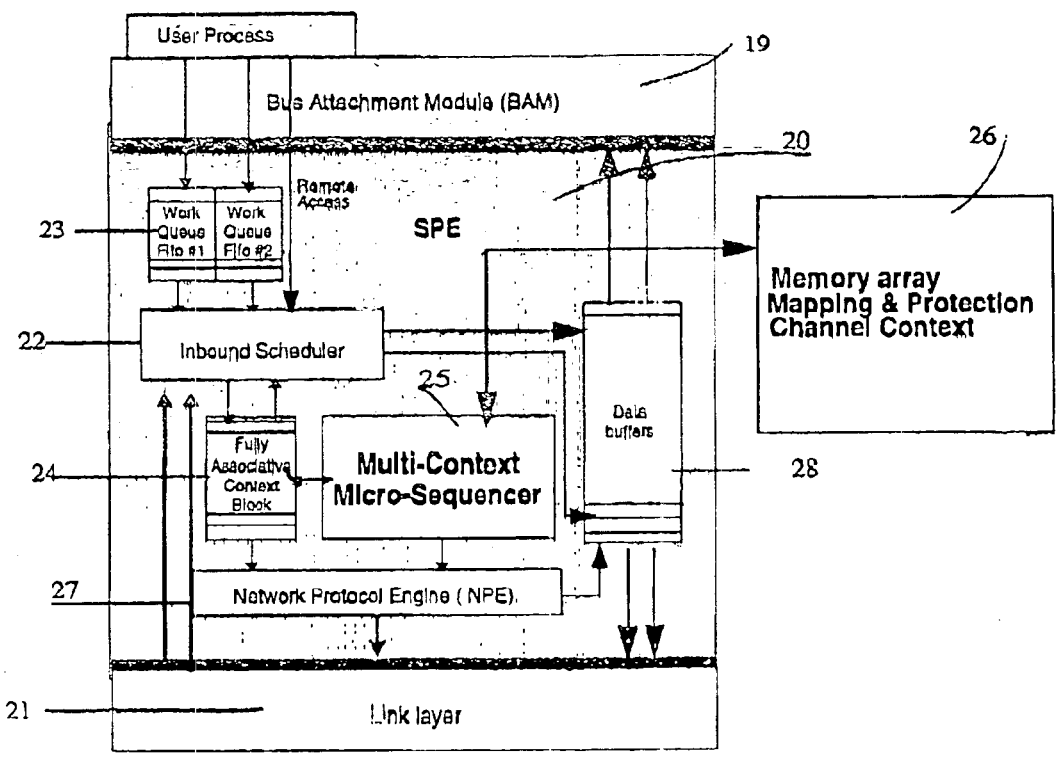
Figure 4. San Protocol Engine

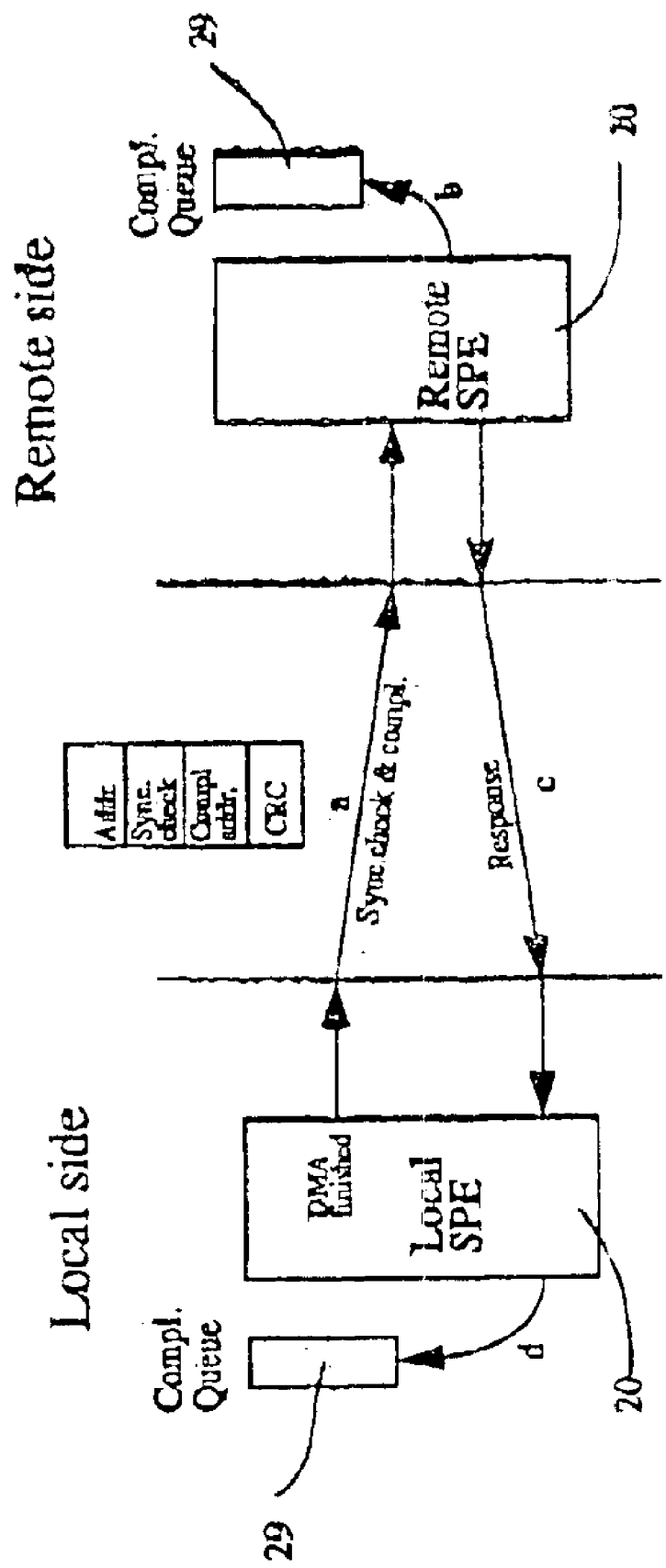
Figure 5. Local and Remote Completion Control

COMPUTER NETWORK CONTROLLER

BACKGROUND FOR THE INVENTION

The present invention relates generally to the field of computer networks, and in particular to a general computer network controller and a method for local and remote asynchronous completion control in a system area network.

Most existing high-performance network controllers have to be managed by the operating system or by kernel agents in order to guarantee protected accesses across different nodes. Users have to do system calls to remote memory through high latency programming interfaces. In addition, explicit synchronization and completion control decreases the sustained bandwidth between users. These problems are described in "An Implementation and Analysis of the Virtual Interface Architecture", http://www.berkeley.edu/~philipb/via/sc98/paper/index.htm.

Communication between network controllers in a system area network (SAN) is handled by switching fabrics and point-to-point links. Among the situations which create network congestion are, i) a failed network component, ii) a high-performance node sending packets into a low-performance node, iii) several nodes sending data packets to one particular node (thus creating a hot-node). If such a congestion problem is not handled property, network throughput will be reduced.

U.S. Pat. No. 5,613,071 (Rankin et al.) discloses a method and an apparatus for providing remote memory access in a distributed memory multi-processor system.

Further, U.S. Pat. No. 5,915,088 (Basavaiah et al.) discloses a multi-processor system that is configured so that each CPU of the system has access to at least portions of the memory of any other CPU.

These two patents describe a more general way of doing RMA with address mapping which has been available for some time. They do not refer to any implementation issues or method of optimization.

Particularly in a SAN network, it is important to find a method of scheduling packets based on e.g. priorities, control messages, data messages, and to avoid congestion. Also, when managing virtual channels (virtual channels are described more fully in co-pending U.S. patent application Ser. No. 09/520,063, entitled "Virtual channel flow control", assigned to the assignee of the present application, the relevant disclosures of which co-pending application are incorporated herein by reference), a solution must be found regarding the problem of providing a method of reacting to the flow control information provided by the SAN layer.

Generally, a network controller forwards packets to the attached bus as they arrive from the network. That is, the bus to which the network controller is attached, may not necessarily be utilized to its optimum. This leads to a possible problem of decreased bandwidth.

SUMMARY OF THE INVENTION

The computer network controller of the present invention solves or at least alleviates the problems of the prior art as stated above. The network controller of the present invention solves or alleviates the congestion problem by its inherent ability to do implicit fabric rate injection control. The network controller of the present invention also solves or alleviates the problem of reacting to flow control information from a link layer, by having the ability to schedule packets onto different virtual channels depending on congestion information received from the switching fabric. Furthermore, in order to utilize an attached bus to its optimum, the network controller of the present invention decouples the data packet size in the network from the packet size of the bus to which the network controller is attached. Furthermore, the network controller of the invention processes tasks in parallel in order to meet the required bandwidth from both front-end and back-end buses.

Thus, in the most general embodiment of a first aspect of the present invention, there is provided a general computer network controller, preferably operative in a System Area Network, which network controller includes a data buffer handling payload as well as a dedicated, programmable micro sequencer handling control flow and being capable of running different network packets and protocols, being packet format independent and network independent. The programmable micro sequencer is tightly coupled to a fully associative context block for control thereof, and the context block is operative to hold a number of last recently used contexts to provide a dynamic resource allocation scheme reflecting run time situations. Substantial parts of the contexts are updated by the micro sequencer, by an inbound scheduler and by a network protocol engine.

Preferably, the micro sequencer is operative to control a scalable memory array which can be used as a table for inbound address mapping of registered memory and access protection, and as a means for keeping context information about all active channels.

In a preferred embodiment of the invention, the fully associative context block constitutes a connection between the inbound scheduler and the network protocol engine, thereby giving the network controller the ability to pipeline tasks and execute in parallel.

In the same preferred embodiment, the context block may also be operative to have contexts dynamically allocated between inbound Remote Direct Memory Access (RDMA), inbound Remote Memory Access (RMA) and outbound RDMA, two upper contexts nevertheless being reserved for locally driven remote direct memory access, while the context block contains information including the following:

expected sequence number of next packet for checking, input gathering size in order to optimize use of an attached bus, packet type defined by the network for a specific virtual channel, accumulated packet cyclic redundancy check for data integrity, source addresses, destination addresses, mapping for RDMA operations, dedicated flags like page crossing to do new mapping, word count zero detection, as well as protection tag check, all of these information events from the inbound scheduler, the micro sequencer and the network protocol engine to be synchronized by the context block and used by the micro sequencer to invoke, restart, switch or terminate a thread immediately.

In another embodiment of the invention, the micro sequencer is operative to control the network protocol engine which in its turn is operative to perform injection control, based on feedback from a link layer as well as intervention from an operative system. The network protocol engine is then operative to schedule packets to the network.

In this embodiment, the network protocol engine may further be informed about onto which virtual or physical lane packets are going to be sent, and it may also utilize the capability of the data buffer and transmit up to four packets from different tasks simultaneously, namely a request and a response to the network and a request and a response to an attached bus.

In a further embodiment of the first aspect of the invention, the inbound scheduler is operative to decode, schedule and invoke running tasks or allocate new tasks, based on
i) packets received from the network,
ii) memory mapped operation received from a bus attachment module,
iii) descriptors inserted in work queue fifos by a user application, and
iv) tasks received from the context block.

In another aspect of the present invention, there is provided a method for local and remote asynchronous completion control, for use in a System Area Network. The System Area Network comprises a plurality of host channel adapters, a plurality of target channel adapters and a switching fabric, and each respective one of the adapters is constituted by a computer network controller of the type as defined above in the most general embodiment stated, together with a bus attachment module and a network interface. In the method of the invention, message cyclic redundancy check as well as an address to a remote completion queue, e.g. at a target, are attached, by such a micro sequencer, to a last packet in a message to be sent from a sender, e.g. a host to a receiver, e.g. a target. Thereby, on reception of the last packet at the receiver and checking for data integrity for the whole message transfer by a target micro sequencer, "receipt complete" can be signaled directly from the target micro sequencer in the remote process completion queue, and simultaneously a response is made back to the sender. The sender will then signal "send complete" and status directly to a local process.

As appears from the above, the present invention provides apparatus and a method for implementation of a "network protocol engine", i.e. a network controller, for use particularly, but not only, in SAN networks, in particular HCA (host channel adapters) and TCA (target channel adapters). In a SAN it is then referred to an SPE, i.e. a SAN Protocol Engine.

The present invention is based on a programmable Multi-Context Micro Sequencer (MCMS), running dedicated instructions optimized for network protocols. A dynamic resource allocation scheme reflects the runtime situations by keeping the most recently used tasks in a Fully Associative Context Block (FACB). In connection with the micro sequencer is a configurable memory array used for inbound address mapping and access protection, and keeping context information of all the active channels not currently present in the FACB. Associated with the MCMS is a Data Buffer with a number of read and write ports. This enables the SPE to run different tasks in parallel. Attached to the MCMS is a Network Protocol Engine (NPE), scheduling packets based on i) congestion information provided by the layer flow control, ii) knowledge of the SAN topology (i.e. injection rate control), iii) priorities of packets.

The network controller of the present invention is capable of running multiple protected user-level RDMA with implicit completion control.

The SPE is independent of network packet length. Packet length is programmable in order to improve bus bandwidth by doing input gathering, and the SPE can therefore optimize the use of the attached buses.

BRIEF DESCRIPTION OF THE DRAWINGS

The above and further advantages may be more fully understood by referring to the following exemplary description of embodiments, in conjunction with the accompanying drawings of which:

FIG. 1 presents an overview of a System Area Network.

FIG. 2 presents a general purpose network packet.

FIG. 3 presents a block diagram of a general HCA/TCA including a SPE.

FIG. 4 presents a detailed block diagram of an SPE in accordance with a preferred embodiment of the invention.

FIG. 5 illustrates Local and Remote Completion Control in accordance with a preferred embodiment of another aspect of the invention.

DETAILED DESCRIPTION

The computer network controller of the present invention can be applied in any computer network (a LAN, a SAN), but it exhibits characteristics that make it particularly well suited for use in a System Area Network (SAN). The embodiments described in the following will refer to a SAN application. Also in the following, the term SAN Protocol Engine (SPE) will be used as a synonym for "computer network controller".

A System Area Network (SAN) 1 is depicted in FIG. 1. A SAN is a network which interconnects a plurality of computers (hosts) 2 and a plurality of IO-devices 8, and/or IO-subsystems. This enables Inter-Processor Communication (IPC) (or clustering), host-to-peer (IO) communication, and peer-to-peer communication, over the same network. The host SAN access point is called a Host Channel Adapter (HCA) 6, while the peer SAN access point is called the Target Channel Adapter (TCA) 3. Interconnection between HCAs and/or TCAs is handled by high-performance point-to-point links 5 and switching fabrics 4. Communication between HCAs and/or TCAs is either achieved by sending messages, or by doing memory-mapped communication (e.g. DMA, Direct Memory Access) and/or Programmed-IO (PIO) from a local node to a remote node. Usually the following transfer models are supported:

Acknowledged connection-oriented

Unacknowledged connection-oriented

Unacknowledged connection-less

All transfer methods are based on partitioning data into network packets by a SPE. A data packet 7 is shown in FIG. 2, and is constituted by a packet header 12, a payload part 14 and a packet trailer 11. Each packet header 12 contains at least i) a destination address (Destination ID) 13 describing the network address of the packet's destination and to be used by the switching fabric 4 to route the packet 7 to the correct destination, ii) a source address 15 describing the network address of the sender of the packet, iii) a command 17, describing the function the receiver of the packet should perform, and iv) a sequence number 18. If the packet contains data (payload), an address notification 16 is required, so the receiver will know where to put the data.

Each packet trailer 11 is required to have an error-detecting code, usually a cyclic-redundancy check (CRC), to secure data integrity of the complete packet.

Packets are always received in the order they were sent, i.e. the switching fabric 4 does not re-order packets during normal operation.

FIG. 3 shows a simplified block diagram of a general HCA/TCA 3, 6, and indicates on respective sides of a SAN Protocol Engine (SPE) 20 a Bus Attachment Module (BAM)

19 and a network interface 21, connected to another network unit through a bi-directional point-to-point link 5.

A block diagram of an embodiment of the present invention is shown in FIG. 4. As mentioned with respect to FIG. 3, the SPE interface to the host bus or peer bus is referred to as the Bus Attachment Module (BAM) 19. The SPE interface 21 to the network is referred to as the network layer.

The present invention uses an inbound scheduler 22 to decode, schedule and invoke currently running tasks or allocate new tasks, based on i) packets received from the network, ii) memory mapped operations received from the BAM 19, iii) descriptors inserted in work queue fifos 23 by the user application, and iv) tasks received from a fully associative context block (FACB) 24. The inbound scheduler 22 invokes a multi-context micro-sequencer (MCMS) 25 by a special set of instructions.

The present invention supports the concept defined in the Infiniband Architecture scheduled to be released mid 2000. That means that messages and DMA transfers can be managed directly between users without intervention from the system kernel. In practice this means that user address space on one node is mapped directly to user space on a remote node. Infiniband defines a set of channels with fixed mapping between local and remote memory.

An Address Translation Table (ATT) contained in a block 26 is setup once by the kernel agents (device drivers) on both sides of the connection, when the memory is registered. Unique contiguous address space is then exported to the users, and is used as reference. This means that the HCA/TCA has the notation of both local physical memory and the virtual remote memory through its inbound and outbound mapping tables, and remote traffic is managed from a set of chained descriptors set up directly users. Block 26 is a configurable memory array that is used for inbound address mapping and inbound/outbound access protection. Additionally, block 26 keeps context information of all active channels that are not currently present in the FACB 24. Memory array 26 is controlled and updated by micro sequencer 25.

The ATT size is programmable, and depends on the number of Queue Pairs (QP) supported, and number of bits per Protection Tag (PTag), E.g. an ATT with 1M entries and 16-bit PTag may have 64 k Channels. The ATT is accessed for new tasks or when page crossing occurs during RDMA.

The work queue fifos 23 contain addresses and protection tags of descriptors inserted directly by the user or kernel agent. The present invention is, however, not limited to the use of these fifos. They are merely used as an illustration on how communication between the SPE and user application may be performed.

In the preferred embodiment of the present invention, a FACB24 is used to hold e.g. the 16 last recently used contexts. The two upper contexts are reserved for locally driven RDMA, while the other 14 are then dynamically allocated between inbound RDMA, inbound RMA and outbound RMA. The context block 24 contains source addresses (SourceID) and destination addresses (destinationID) and mapping for RDMA operations, dedicated flags like page crossing in order to do new mapping, word count zero detection, data buffer management and integrity check, events like sequence error, protection tag check. The FACB synchronizes all these events from The Inbound Scheduler 22, the Multi-context Micro Sequencer 25 and a Network Protocol Engine 27 (that executes the function of a link-dependent packet sender and outbound scheduler), so that threads are invoked, restarted, switched or terminated immediately.

The Multi-context Micro Sequencer 25 is optimized for running network related instructions. The MCMS itself is packet and network independent.

The SPE 20 can, in the embodiment under discussion, process up to 8 separate data paths simultaneously (4 data paths default). The MCMS handles the control flow, while a data buffer 28 handles the payload, Both units execute independently. The data buffer 28 contains up to 4 write ports and 4 read ports, for high-efficient data movement. The number of entries is equal to the number of FACB entries. The width is programmable. RMDA has dedicated output buffers for efficient pipelining.

The MCMS 25 detects and flags immediately (1 cycle) special events-like page boundary crossing, word-count-zero and different error conditions. New tasks are invoked with minimum delay, while task switching is performed in 2 cycles.

The MCMS can be programmed to gather packets received from the network (Input gathering). Thus, the present invention can therefore optimize the use of the attached bus 19.

The MCMS 25 performs on-the-fly data integrity check. Messages can be checked either on each page boundary or at the end of the message. Individual packets are checked by the link layer level. In case of an acknowledged connection-oriented transfer model, a negative acknowledge packet is returned to the sender if the data was checked to be incorrect. If a sender (i.e. network controller) does not receive an acknowledge packet within a fixed time period (watchdog timeout), the transfer is marked unsuccessful and the SPE will have to re-transmit the packet(s).

In case the MCMS receives a negative acknowledgement it will re-transmit the packet.

The MCMS provides integrated local and remote completion. The last packet sent in a message contains both the accumulated message CRC and completion control. The SPE on the receiving HCA/TCA side can therefore signal "receive complete" directly in the remote process's Completion Queue (CQ), and simultaneously respond to the initiator (sender), by sending an acknowledge packet. Upon receiving an acknowledge response, the initiator then signals "send complete" to the local process. No explicit synchronization is needed. The user on the remote side can decide whether to poll the transaction status locally, or being invoked by interrupt. The completion control can be described in the following scenario, while referring to FIG. 5.

a) The FACB 24 on local side detects that word count is zero, a flags this immediately to the Host MCMS. The MCMS then extracts the accumulated message CRC and the Remote completion Queue address from the RDMA context, dispatches a "last" packet to the Transmitter, and switches context.

b) When the remote side detects such a packet, the remote FACB checks the accumulated CRC and invokes the associated context. The remote MCMS checks the flag, writes status to the CQ 29 and switches context.

c) When the "write response" returns from the BAM, the context is invoked again and the MCMS sends a response back to the host node, and terminates the context.

d) When this response arrives at the host node. "send complete" and status are written to the channel's completion queue, and the context is terminated.

This scheme will reduce almost all protocol overhead, and sustained user throughput will increase dramatically.

As previously mentioned, the present invention uses a Network Protocol Engine 27 to schedule packets to be sent onto the network. The NPE scheduler is capable of link injection control, based on feedback from the link layer 21.

The SPE may transmit up to four packets from different tasks simultaneously, a request and a response to the network, and the same to the attached bus, processing 32 bytes pr. cycle (64 bytes with 128-bit wide data paths).

In the above description, reference has been made to an embodiment of the invention particularly as depicted in the appended drawings. However, it will be appreciated that various modifications and alterations might be made by persons skilled in the art without departing from the spirit and scope of the present invention. The scope of the invention should therefore only be restricted by the claims that follow, or equivalents thereof.

What is claimed is:

1. A general computer network controller for a network node, coupled to a system area network, said controller comprising:
    a network protocol engine configured to schedule packets for transmission onto the system area network;
    a data buffer configured to handle one or more payloads;
    a fully associative context block configured to hold a plurality of last recently used contexts to provide a dynamic resource allocation scheme reflecting run time situations;
    an address translation table coupled to said network protocol engine and configured to:
        maintain inbound address mapping; and
        store context information not currently stored in said context block; and
    a dedicated, programmable micro sequencer tightly coupled to said context block and configured to:
        control said context block; and
        handle control flow and process multiple types of network packets and protocols;
    wherein said micro sequencer is packet format independent and network independent; and
    wherein said contexts are updated by said micro sequencer, by an inbound scheduler and by said network protocol engine.

2. The computer network controller of claim 1, further comprising:
    a scalable memory array configured as a table for inbound address mapping of registered memory and access protection, and further configured as a means for keeping context information about all active channels.

3. The computer network controller of claim 1, wherein said fully associative context block couples said inbound scheduler and said network protocol engine, thereby facilitating an ability of said network controller to pipeline tasks and execute in parallel.

4. The computer network controller of claim 3, wherein:
    said context block is configured for dynamic allocation of contexts between inbound remote direct memory access, inbound remote memory access and outbound remote memory access;
    two upper contexts are reserved for locally driven remote direct memory access; and
    said context block is configured to store information including one or more of the following events:
        expected sequence number of a next packet for sequence checking,
        input gathering size in order to optimize use of an attached bus,
        packet type defined by the network for a specific virtual channel,
        accumulated message cyclic redundancy check for data integrity,
        source addresses,
        destination addresses,
        mapping for remote direct memory access operations,
        dedicated flags to facilitate new mapping,
        word count zero detection, and
        protection tag check; and
    wherein said events:
        are received from said inbound scheduler, said micro sequencer and said network protocol engine;
        are synchronized by said context block; and
        are used by said micro sequencer to invoke, restart, switch or terminate a thread immediately.

5. The computer network controller of claim 1, wherein:
    said micro sequencer is further configured to control said network protocol engine;
    said network protocol engine is configured to perform link injection control, based on feedback from a link layer and intervention from an operative system; and
    said network protocol engine is further configured to schedule packets to the network.

6. The computer network controller of claim 1, wherein said inbound scheduler is configured to decode, schedule and invoke running tasks or allocate new tasks, based on:
    i) packets received from the network,
    ii) memory mapped operations received from a bus attachment module,
    iii) descriptors inserted in first-in, first-out work queues by a user application, and
    iv) tasks received from said context block.

7. In a system area network comprising a switching fabric, a plurality of host channel adapters and a plurality of target channel adapters, each said adapter comprising:
    a network protocol engine configured to schedule packets for transmission onto the system area network;
    a data buffer configured to handle one or more payloads;
    a fully associative context block configured to hold a plurality of last recently used contexts to provide a dynamic resource allocation scheme reflecting run time situations;
    an address translation table coupled to said network protocol engine and configured to:
        maintain inbound address mapping; and
        store context information not currently stored in said context block;
    a dedicated, programmable micro sequencer tightly coupled to said context block and configured to:
        control said context block and handle control flow; and
        process multiple types of network packets and protocols;
    a bus attachment module; and
    a network link interface;
    wherein said micro sequencer is packet format independent and network independent; and
    wherein said contexts are updated by said micro sequencer, by an inbound scheduler and by said network protocol engine.

8. A protocol engine for a channel adapter configured to interface a system area network with a network node, the protocol engine comprising:
    an inbound scheduler configured to schedule one or more of the following for each of a plurality of tasks: decoding, scheduling and invoking;

a multi-context micro sequencer configured to handle control flow for multiple communication channels between the network node and the system area network, wherein said multi-context micro sequencer is packet format independent and network independent;

a context block configured to store a set of least recently used contexts, wherein each said context corresponds to one of the communication channels;

a data buffer configured to buffer payloads of packets for the multiple communication channels; and a network protocol engine configured to schedule transmission of packets onto the system area network;

wherein a subset of said set of contexts stored in said context blocks is reserved for outbound RDMA (Remote Direct Memory Access); and wherein a remainder of said contexts in said set of contexts are dynamically allocated among inbound RDMA, inbound RMA (Remote Memory Access) and outbound RMA.

9. The protocol engine of claim 8, wherein said multi-context micro sequencer is further configured to:

detect page boundary crossing and word count zero; and perform an integrity check of a message, wherein the message comprises one or more packets.

10. The protocol engine of claim 8, wherein said multi-context micro sequencer is further configured to perform integrated local and remote completion.

11. The protocol engine of claim 8, wherein each said context stored in said context block comprises one or more of:

a source address;
a destination address;
RDMA operation mapping;
expected sequence number of a next packet;
an accumulated cyclic redundancy check; and
a set of dedicated flags for performing one or more of:
word count zero detection;
packet integrity checking;
sequence error checking;
protection tag checking; and
data buffer management.

12. The protocol engine of claim 8, wherein said data buffer comprises a number of entries equivalent to the number of least recently used contexts stored in said context block.

13. The protocol engine of claim 8, wherein said data buffer comprises:

multiple read ports; and
multiple write ports;
wherein said multiple read ports and multiple write ports facilitate processing of multiple tasks in parallel by the protocol engine.

14. The protocol engine of claim 8, further comprising:

one or more work queues configured to store descriptors inserted by applications executing on the network node; and an inbound scheduler configured to schedule processing of said descriptors.

15. The protocol engine of claim 14, wherein said inbound scheduler is further configured to schedule:

receipt of a packet from the system area network;
a memory-mapped operation received from the network node; and
a task received from said context block.

16. The protocol engine of claim 8, further comprising:

a first connection coupling the protocol engine to an internal bus of the network node; and a second connection coupling the protocol engine to the system area network.

17. The protocol engine of claim 16, further comprising:

a third connection coupling the protocol engine to an address translation table;
wherein the address translation table is configured to:
maintain inbound address mapping; and
store context information not currently stored in said context block.

18. The protocol engine of claim 16, wherein the size of packets exchanged between the protocol engine and the network node differ from the size of packets exchanged between the protocol engine and the system area network.

* * * * *